Jan. 21, 1958   P. SPENCE   2,820,472
ADJUSTABLE VALVE-ACTUATING MEANS
Filed Feb. 8, 1955
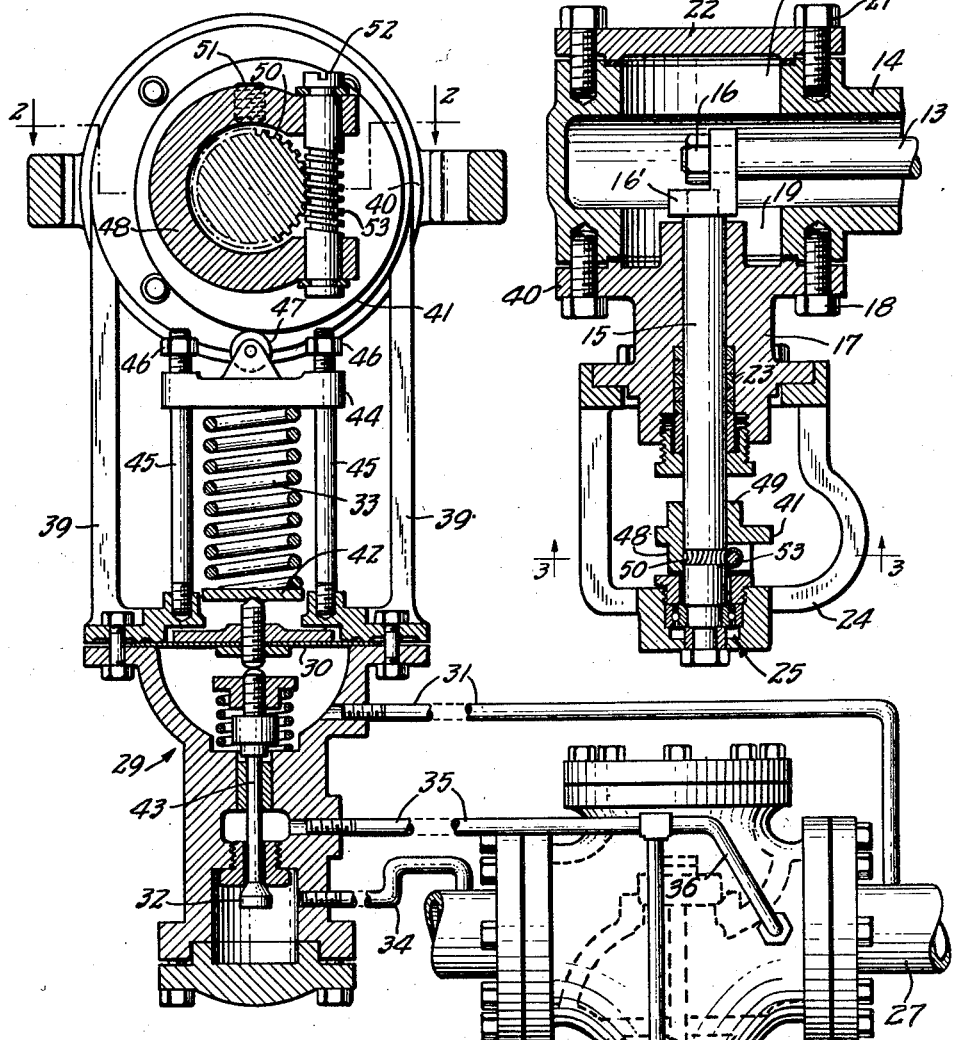
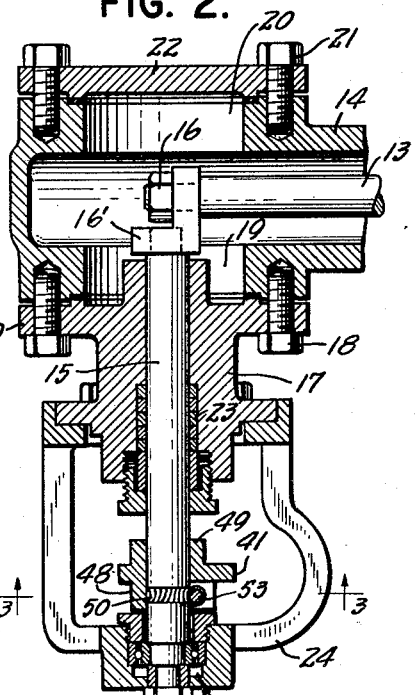
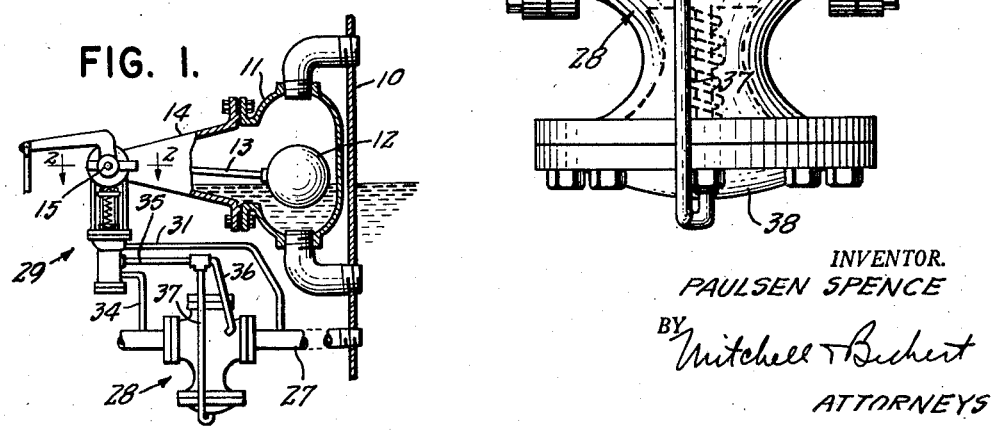
INVENTOR.
PAULSEN SPENCE
BY Mitchell & Bechert
ATTORNEYS

United States Patent Office 2,820,472
Patented Jan. 21, 1958

2,820,472

ADJUSTABLE VALVE-ACTUATING MEANS

Paulsen Spence, Baton Rouge, La.

Application February 8, 1955, Serial No. 486,892

1 Claim. (Cl. 137—413)

My invention relates to an improved rotary-stem construction for a float-operated or like mechanism and, in particular, to the combination of the same with valve mechanism.

It is an object to provide improved means of the character indicated.

It is another object to provide an improved rotary stem and valve with readily adjustable means for adjustably coordinating these elements.

It is a further object to provide improved regulating-valve means in combination with float mechanism and characterized by adjustable connection of the float mechanism to the valve.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 1 is a simplified side elevation in partial section, showing a float chamber forming part of a tank supplied by valve means of the invention;

Fig. 2 is an enlarged sectional view in the plane 2—2 of Fig. 1; and

Fig. 3 is a sectional view in the plane 3—3 of Fig. 2; the plane of Fig. 2 is also identified by the line 2—2 of Fig. 3.

Briefly stated, my invention contemplates a rotary stem journalled in a housing and serving to interconnect mechanism inside the housing with mechanism outside the housing; the mechanism outside the housing may include valve means controlled by mechanism inside the housing by way of an angularly adjustable cam on the rotary stem. The mechanism inside the housing may include a valve member, but in the form to be specifically described, the mechanism inside the housing is float-operated, and the external valve mechanism regulates the supply of fluid to the tank or reservoir in which the float is placed. The valve may be a pilot-controlled regulator of the pressure-responsive variety with means resiliently loading the pressure-responsive element of the pilot, and my novel connection including the cam is made to the loading means for the pressure pilot.

Referring to the drawings, my invention is shown in application to level-control mechanism for a tank 10 having a side-mounted float chamber 11 containing a float 12 on an arm 13. The chamber 11 may include a side housing or extension 14 to accommodate arm 13, and motion of arm 13 may be transmitted through the housing 14 by way of a rotary stem 15; a nut 16 (Fig. 2) is shown removably connecting arm 13 to stem 15, by way of a bracket or lug 16' keyed to stem 15.

I prefer that the means providing support for the rotary stem 16 shall include a bonnet 17 removably secured, as by bolts 18, to a bonnet opening 19 in the side-arm housing 14. The opening 19 may be one of two openings 19—20 at oppositely facing sides of the housing 14. The openings 19—20 are preferably of the same size and are similarly bored and tapped to accommodate securing bolts 18—21. The arrangement thus provides for selective application of the bonnet 17 either to cover the opening 19 or the opening 20, and the opening 20 not used for the bonnet 17 may be closed by a cap or cover 22. The bearing for stem 15 preferably includes stuffing means 23 and a removable frame 24 for supporting an outboard antifriction bearing 25, all in the manner disclosed in greater detail in my copending application Serial No. 442,986, filed July 13, 1954.

For the arrangement shown, feed control at the inlet 27 to tank 10 is provided by regulating means including a main valve 28 and a pilot valve 29. The pilot may include a pressure-responsive member or diaphragm 30 responsive to pipe or tank pressure, as provided by connection 31 to the feed pipe 27 shown. Pilot 29 may include a valve member 32 of the normally-open variety, that is, urged by resilient loading means 33 into a valve-open position, in the absence of sufficient control pressure via line 31. When in the open position, valve member 32 admits upstream pressure fluid via a line 34 to a control-pressure line 35; line 35 has a bleed connection 36 to the downstream side of the main valve 28 and a control connection 37 to the diaphragm or other pressure-responsive means beneath the bonnet 38 of the main valve. Standards 39 rigidly connect the pilot-valve framework to the base 40 of the bonnet 17.

In accordance with the invention, I provide an adjustable control connection between the mechanism 13 within the housing 14 and the mechanism 29 outside the housing 14. This adjustable connection is shown to include an externally accessible cam 41 carried by the stem 15 and in adjustable loading relation with the resilient loading means 33. As shown, the loading means 33 is compressed between a plate 42 (in direct-driving relation with the stem 43 of the pilot valve 29) and a cross-head 44, slidable in spaced guides 45 and limited by stop-nuts 46. A cam-follower roll 47 is mounted on the cross-head 44 to ride the cam 41.

In order to adjust coordination between the mechanism 13 inside the housing and the mechanism 29 outside the housing, I provide means for adjustably selecting the angular position of the cam 41 on the rotary stem 15. For this purpose, the cam 41 is seen in Fig. 2 to include enlarged hub portions 48—49 on both axial sides thereof. The portion 48 carries worm means 53 engaging a toothed portion 50 of the stem 15, and the hub portion 49 may be provided with set-screw means 51 to secure a given angular adjustment. In the arrangement shown, a screwdriver slot 52 on one exposed end of the worm 49 facilitates cam adjustment.

In use, and beginning with an empty tank 10, there will be substantially no pressure in line 31, so that pilot-valve member 32 will be wide open to control admission of maximum flow in main valve 28. This maximum flow is, of course, governed by downstream-developed pressure (sampled by line 31) while tank 10 is filling. Upon attainment of the desired level, float 12 will drive stem 13 counterclockwise in the sense of Fig. 3, thereby relieving the loading of cam 41 on spring 33, so that pilot 29 may close to shut off main valve 28. The approach to shut off is a gradual one, determined by the slope of cam 41, and by the resulting gradually reduced regulated flows passing through main valve 28 for each counterclockwise increment of cam movement. This means that the tank can be quickly filled substantially to the desired level, and yet feed control after the tank has been filled can be extremely sensitive to slight changes in level. For the fluid-level embodiment shown, the means 50—53 thus provides simple adjustment for precision control of level.

While I have described my invention in detail for the preferred forms illustrated, it will be understood that modifications may be made within the scope of the invention as defined in the claim which follows.

I claim:

In combination, a tank, supply means for said tank and including a main valve and a pressure pilot valve in controlling relation with said main valve, said pilot valve having a pressure-responsive connection reflecting tank pressure, resilient loading means for said pressure pilot valve, float mechanism responsive to fluid level in said tank, means including a rotary stem connecting said float mechanism in variable biasing relation with said resilient loading means, said last-defined means including a cam on said rotary stem, and means for selectively adjusting the angular position of said cam on said stem.

References Cited in the file of this patent

UNITED STATES PATENTS

| | | |
|---|---|---|
| 1,162,693 | Henry | Nov. 30, 1915 |
| 1,930,027 | Abraham | Oct. 10, 1933 |
| 1,995,949 | Spence | Mar. 26, 1935 |
| 2,060,723 | Brisacher | Nov. 10, 1936 |
| 2,431,283 | Spence | Nov. 18, 1947 |
| 2,735,669 | Seiler | Feb. 21, 1956 |